_United States Patent Office_  
3,053,648  
Patented Sept. 11, 1962

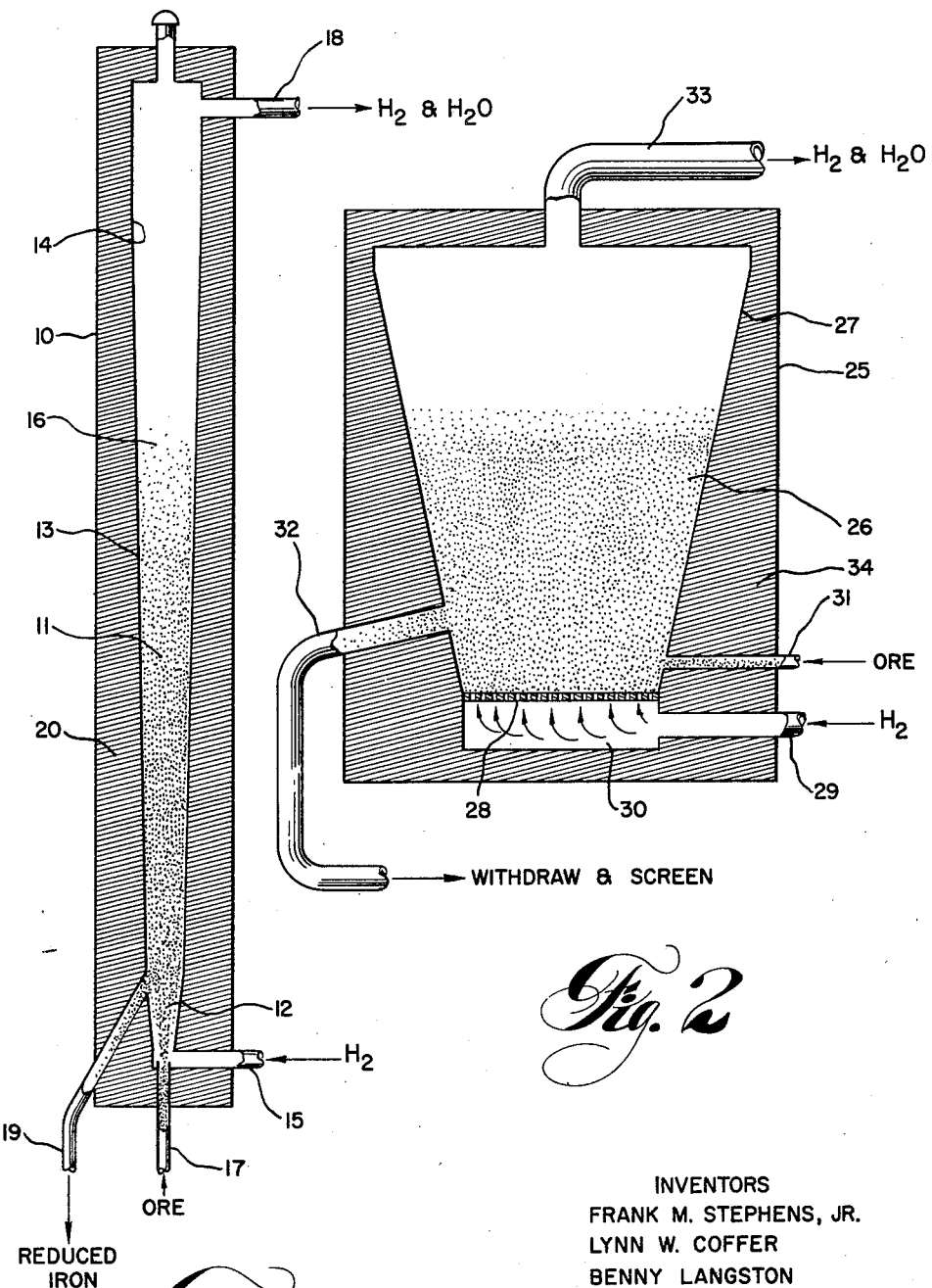

3,053,648
REDUCTION OF IRON ORE

Frank M. Stephens, Jr., Lynn W. Coffer, and Benny Langston, Columbus, Ohio, assignors to Battelle Memorial Institute, Columbus, Ohio, a corporation of Ohio Filed Oct. 8, 1959, Ser. No. 845,214
5 Claims. (Cl. 75—26)

This invention relates to the production of metals and, particularly, to the recovery of metals from their finely divided metal ores, such as iron from iron ore, by reduction of the oxides while in a fluidized bed.

Many attempts have been made to develop methods for the direct reduction of iron oxides to metallic iron. These methods have employed various types of reducing equipment, including rotary kilns, hearth furnaces, sintering machines, and fluidized beds. Of these types of equipment, only the fluidized bed unit has shown promise for the treatment of finely divided materials, such as the concentrates currently being produced from low-grade iron ores. The main advantages of the use of fluidized beds are the excellent gas-solid contact and temperature control that can be obtained in this type of process.

With the use of conventitonal fluidized bed reactors, however, several disadvantages also exist. The volume of reducing gas that can be passed through the reactor is dependent upon the gas velocity that can be used without carrying along the finely divided solids and, in turn, the amount of material that can be treated is dependent on how much reducing gas can be passed through the reactor. This makes the direct reduction of iron ore in a fluidized bed a difficult problem, because a large excess of reducing gas is required to complete the reduction to metallic iron, and, if the volume or velocity of the reducing gas must be limited, then the capacity of the unit will, of necessity, be limited. The gas volume could be increased by operating the unit under pressure but this greatly increases the cost of the equipment which would be necessary.

Ordinarily, materials that become soft or sticky when being treated cannot be handled in a fluidized bed unit because they tend to stick together and become defluidized. When iron oxides are reduced to metallic iron, they tend to become soft and sticky if the reduction is carried to completion at elevated temperatures. Reduction at temperatures below 1300° F., or reduction of only 80 to 90 percent of the feed to metallic iron, tends to prevent the material from becoming sticky and from defluidizing. But, in turn, pyrophoric material is produced if the lower temperature is used, or at higher temperatures an incompletely reduced material of limited usability is produced. In addition, if hydrogen is used as a reducing agent, a larger excess of hydrogen is required for reduction at temperatures of 1300° F. than is required at 1550° F.

The process of this invention operates in a modified fluid bed in which fine feed is self-agglomerating. This permits the use of high gas velocities and results in high unit capacities at low pressures. The fact that freshly reduced iron oxide softens and becomes sticky at high temperatures is responsible for the agglomeration of the fine feed and, thus, gives fast reaction rates and produces an agglomerated nonpyrophoric end product.

One advantage of this invention is the production in a fluidized bed of an agglomerated reduced iron product which is nonpyrophoric while operating with finely divided at elevated temperatures.

To these and other ends, this invention comprises a method, the preferred form of which is disclosed in the following description and attached drawings. Although the method described and shown in detail is referred with particularity to reduction of iron oxide in a fluidized bed, it is apparent that this invention should not be limited thereto. Many of the significant features of this invention apply with equal qualification to the reduction of any metal oxide. The invention may be used for other purposes where its features are advantageous.

In the drawings:

FIG. 1 is a schematic elevational view of a reactor in which the invention may be practiced;

FIG. 2 is a schematic elevational view of another example of a reactor in which the invention may be practiced;

Figure 3:
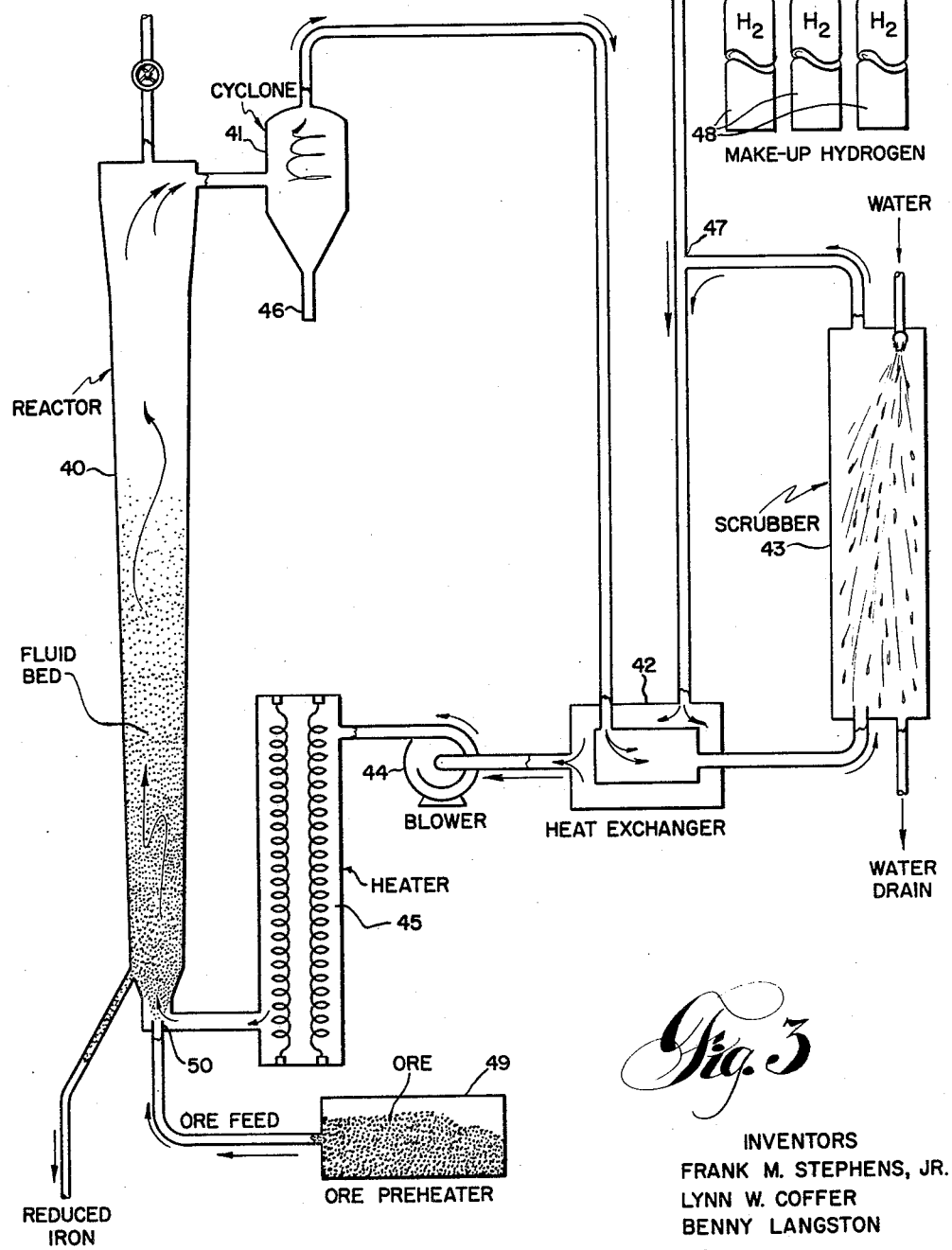
FIG. 3 is a schematic diagram of typical auxiliary apparatus in conjunction with the reactor.

Referring to FIG. 1, the vertical shaft reduction chamber, or reactor 10, may vary in dimensions, depending partially on the size of the fluidized bed 11 that is desired. One embodiment, in particular, may be a small-diameter reactor which is tapered to minimize the problems encountered in fluidizing a sticky bed and to reduce the velocity of gases at the top of the bed 11. The conical bottom 12 of the reactor 10 may be tapered to permit fluidization of enlarged pellets. The reactor walls 13, above the conical bottom 12, are also tapered but not as much as the conical bottom 12. To decrease the gas velocity, the taper may be increased in about the next few feet of length near the top 14 to give a larger diameter. The over-all height of such a reactor would be about 32 times the diameter just above the conical bottom.

The vertical shaft reduction chamber, or reactor 10, is charged with pelletized metallic iron of a size range smaller than the pellet desired for the final product. Preheated reducing gas or hydrogen at an elevated temperature of preferably about 1550° F. enters through conduit 15. This gas passes upward through the pellet bed 11 fluidizing the pellets in the shaft 16. A comminuted concentrated iron ore, preferably comprising at least 60 percent iron, is then introduced through the feed pipe 17 into the fluidibed bed 11. The finely divided ore particles are reduced to metallic iron at a temperature of about 1550° F. A portion of the finely divided particles is agglomerated on the outer surface of the original pellets and, at the same time, additional pellets of increasing size are generated by self-agglomeration. The reducing gas and water vapor mixture produced in the reduction of the iron ore is continuously withdrawn from the top of the reaction chamber through a conduit 18. As some of the metallic iron pellets grow in size, they become too large to be sustained in the fluidized bed 11 and, therefore, are continuously withdrawn from the reaction chamber through a conduit 19. The process then becomes self-generating, so that, as reducing gas and finely divided iron ore are continuously introduced, the reaction products of iron, reducing gas and water are continuously withdrawn. The entire reactor 10, is surrounded by a suitable insulating material 20.

As an example, another type of reactor which may be used with this method is that shown in FIG. 2. The reduction chamber or reactor 25 can be built to contain a larger fluidized bed 26 than the long vertical shaft reactor 10 of FIG. 1. The sides 27 of the reactor 26 are tapered inwardly toward the bottom which contains an orifice plate 28. The reactor 25 is charged with pelletized metallic iron. The reducing gas enters through conduit 29, passes into chamber 30 and through orifice plate 28 into the pellets of iron, fluidizing the bed of pellets. The ore is fed into the reactor 25 through the feed pipe 31 and the reduced ore is withdrawn through conduit 32. Since the reactor 26 of FIG. 2 does not contain a conical section, such as the conical section 12 of reactor 10 in FIG. 1, the various sized pellets will be rather thoroughly mixed throughout the bed. Thus, in drawing off pellets through the conduit 32, reduced iron pellets of varying size will be obtained. The pellets may therefore be separated by screening them and returning the smaller size to the reactor. The reducing gas and water vapor mixture is withdrawn through conduit 33 at the top of the reactor 25. The entire reactor is surrounded by a suitable insulating material 34.

In any fluidized bed system the particles being fluidized are constantly in motion and undergo a continuing series of contacts with each other. For this reason, it is normally difficult, or impossible, to fluidize any material which becomes sticky or soft while being treated, because the particles tend to stick together and form one single large piece which cannot be fluidized. The ability of the particles to stick together depends on their adhesive properties, their area of contact, and their inertia of motion. The tendency to stick is directly proportional to the adhesive property and area of contact and inversely proportional to the inertia of motion. Thus, stickiness, S, is in the following relation:

$$S = \frac{A \times B}{C}$$

where A is the adhesive properties, B is the area of contact, and C is the inertia of motion.

In a conventional system containing only small particles, which are soft or semimolten, the adhesive force and area of contact are relatively large, while the inertia of motion is small because of the large surface area to mass ratio of the particles. Thus, the entire bed tends to fuse or stick in a single mass.

However, with this invention the stickiness S, or fusion, is controlled by controlling the adhesive properties A and increasing the size of the particles being fluidized.

In this invention where iron oxides are being converted to metallic iron, only the metallic iron is plastic or sticky and the degree of stickiness is dependent on the temperature. Increasing temperature increases the plasticity or adhesive characteristics, so that in this method the degree of stickiness is partially controlled by controlling the temperature.

Also, the relative area of contact B and inertia of motion C are controlled by controlling the particle size of the material being fluidized. The original introduction of metallic iron pellets permits the reactor to be operated at higher temperatures than could be used for the finely divided iron oxide particles alone. The larger particles do not stick together because of their limited areas of contact and high inertia of motion. They still, however, exhibit a relatively sticky or adhesive surface which captures fine particles that are being passed through the bed. It is thus possible to feed finely divided iron oxide particles into the bed of pelletized iron particles so that the fine oxide adheres to the surface of the larger pellet causing it to grow in size and form the nuclei of new pellets through self-agglomeration of the fine feed.

The larger pellets in the fluidized bed, being in continual agitation and less sticky, will help to separate the smaller, stickier pellets in the bed and prevent the fluid bed from sticking together. This is an important factor in charging the reactor with a "starter bed." The starter bed to be used will depend upon the pellet size desired as the final product. Pellet size may be conveniently measured by sizing the material on standard Tyler screen.

For example, assuming pellets of −10 +20 mesh Tyler are desired, if the reactor is charged with pellets, all of equal size, and the temperature is elevated, as the proper temperature is approached, the pellets adhere and fall out of teeter. However, by charging the reactor with about 50 percent of material in the −20 +28 mesh range, 30 percent in the −28 +35 mesh range, 15 percent in the −35 +65 mesh range and 5 percent in the −65 +120 mesh range, the bed fluidizes and remains fluidized as the temperature is raised and ore, crushed to pass a 325 screen, is introduced.

A later sampling of the pellets in the bed will reveal that the fluid bed continues to keep this proportion of pellet-size relationship as fine material is introduced and larger pellets are drawn off. Thus, after the pellet size for the end product has been selected, the starter bed is made up of pellets corresponding to the next four lower Tyler screen size ranges with about 50 percent of the pellets being the largest of these four; 30 percent, 15 percent and 5 percent are of the remainder of the four size ranges with the proportions diminishing with the size of pellet. Of course, other proportions within reasonable limits may be used as long as the sizes of the pellets vary, but the foregoing description is considered an optimum starting bed. Use of the proportions of the various size pellets described above results in the total surface area of each of the various pellet size ranges being approximately equal.

During the growth cycle, it is believed that several other phenomena also take place which aid the system of this invention. First, only a limited layer of iron oxide can be collected on the surface of the reduced pellet without causing the surface to be completely covered with a nonplastic iron oxide coating which can no longer capture fresh feed particles until the iron oxide layer is reduced to metallic iron. Thus, the actual reduction reaction takes place only at the surface of the pellet and does not require diffusion of the reducing gas into the center of the pellet nor diffusion of water vapor out from the center of the pellet. This surface reduction is, therefore, much more rapid than the similar reaction would be if pellets made up completely of iron oxide were being reduced.

Second, once the pellets have grown to a sufficient size so that they become less easily fluidized, they tend to segregate to the bottom of the bed where they can be withdrawn as a finished product of controlled size as in the reactor of FIG. 1, or they may be selectively withdrawn continuously as in the reactor of FIG. 2.

Third, during the course of the reaction, a minor number of finely divided feed particles are reduced to metallic iron in the gas stream without being attached to the larger pellets and these, because of their large surface-area-to-mass ratio, tend to bond to other small feed particles and, thus, form nuclei for perpetuating the grain growth or self-agglomeration condition.

Thus, it is believed that the self-agglomeration phenomenon is caused by large particles or pellets in the fluidized bed having a relatively sticky surface at temperatures above 1300° F. which can be fluidized without sticking to each other. But small particles of the fresh feed will stick to the large particles, causing them to grow in size. The rate of growth for different sized pellets per amount of surface area is the same. However, the rate of growth for different sized pellets per unit of weight is greater in the small pellets due to their larger amount of surface area per unit of weight. Thus, as the pellets increase in size the rate at which their diameter increases slows down appreciably. For example, the addition of a layer of 1 micron of iron on a pellet 1 micron in diamter triples the pellet size but is, relatively speaking, of little notice on a pellet ⅛ of an inch in diameter. Because the reduction of iron oxide takes place at the surface, the reduction is rapid and the finished particles have an "onion skin" growth pattern. The phenomenon is self-perpetuating because fresh nuclei are autogenously in the bed. The velocity of the gas that can be allowed in the fluidized bed reactor is also controlled by the size of the particles being fluidized. When the velocity exceeds the entrainment velocity, as predicted by Stoke's Law, then the particles in the bed will not remain fluidized but will be entrained and carried out with the gas. With the reactor formerly described herein and using metallic iron pellets of −8 +10 mesh Tyler, the velocity of the reducing gas will reach a value of about 38–40 feet per second. The finely divided particles in the stream which are being fed into the reactor will remain in the stream about 1/10 of one second and must agglomerate within that time. The amount of iron oxide that can be reduced to metal is primarily dependent on the amount of reducing gas that can be passed through the reactor. The ability of the system of this invention to take finely divided feed and actually treat it as though it were pellets of −8 +10 mesh Tyler allows the unit to process feed at a capacity up to 400 times as great as would be possible, if, for example, particles of −100 mesh size were being processed.

Fine iron oxide concentrates which are completely reduced to metallic iron at temperatures below the softening point of iron exhibit a tendency, even after careful cooling, to be pyrophoric and to reoxidize on exposure to air with a violent and almost instantaneous reaction. On the other hand, iron oxide reduced at temperatures above its softening point is quite inert when cooled and exposed to air. Thus, this invention, operating at an elevated temperature, produces a product that is easily handled and stored, even though it is completely reduced to a metallic state. This simplifies handling the material and eliminates the need for briquetting or pressing the product in an inert atmosphere.

In a practical system which incorporates the features of this invention and using, for example, hydrogen as the reducing gas, much expense and difficulty are eliminated by utilizing a method or apparatus for retaining the excess hydrogen that is not used up in the reduction of the ore, so that the hydrogen may be reused. Such a system is shown in FIG. 3 and may consist of a reactor 40; a cyclone 41; heat exchanger 42; scrubber 43; blower 44, and heater 45. The hydrogen and water passing from the top of the reactor 40 through the cyclone 41 where some of the water and the dust, entrained during start-up periods of operation, are removed through a drain or exit 46. The hydrogen then passes through one side of the heat exchanger 42 where it gives some of its heat to the hydrogen returning from the scrubber 43. The hydrogen moves from the heat exchanger 42 to the scrubber 43 where additional dust and water are removed. Additional hydrogen is added to the system at 47 from a hydrogen supply source 48. The gas then passes back through the other side of the heat exchanger 42 and into heater 45. A blower 44, used to keep the gas recirculating, may be placed on the cold side of the system.

The ore may be preheated in a preheater 49 and fed into the reactor with the hydrogen at inlet 50. Preheating the ore drives off any excess moisture in the ore and allows high solid feed rates without reducing the temperature inside the reactor.

Whereas a description has been given of an operation, wherein finely divided iron ore may be reduced to metallic iron, in a bed of fluidized solids contained in a reactor using hydrogen for reduction, the process of the invention is not to be limited as to mode of operation, and other variations and modifications may be employed within the limits of the following claims.

What is claimed is:

1. A process for the reduction of iron ore and agglomeration of iron pellets in a fluidized bed, comprising the steps of: charging a reactor with metallic iron pellets of varying size in proportion such that the total surface areas of each of the various sizes are substantially equal to provide agglomeration without defluidization of said bed; fluidizing the charged pellets in said reactor by passing a reducing gas at a temperature of about 1550° F. upward through the pellet bed; continuously introducing preheated concentrated comminuted iron ore substantially at the bottom of said pellet bed; and reducing the comminuted ore particles to metallic iron.

2. A process for the reduction of iron ore and agglomeration of iron pellets in a fluidized bed, comprising the steps of: charging a reactor with metallic iron pellets of varying size in proportion such that the total surface areas of each of the various sizes are substantially equal to provide agglomeration without defluidization of said bed; fluidizing the charged pellets in said reactor by passing hydrogen at a temperature of about 1550° F. upward through the pellet bed; continuously introducing preheated comminuted iron ore, comprising at least 60 percent iron, substantially at the bottom of said pellet bed; and reducing the preheated comminuted iron ore to metallic iron at a temperature of about 1550° F. in the presence of said reducing gas by agglomerating a portion of said comminuted iron ore particles on the outer surface of said pellets and at the same time generating additional pellets by self-agglomeration; continuously withdrawing from the top of the reactor reducing gas and water vapor mixtures produced by the reduction of the iron ore; and continuously withdrawing reduced metallic iron pellets.

3. A process for the production of metallic iron pellets from iron ore, comprising the steps of: charging a reactor with metallic iron pellets of size ranges corresponding to four sequential sizes of mesh Tyler smaller than the size of the metallic iron pellets to be produced; said pellets being in proportion of substantially 50, 30, 15, and 5 percent, by weight, from the largest to the smallest size range, respectively; fluidizing the charged metallic iron pellets in said reactor, by passing a reducing gas at a temperature of about 1550° F. upward through the pellet bed, said pellet bed arranged so that the velocity of said reducing gas is greater at the bottom than at the top of said pellet bed; continuously introducing preheated comminuted iron ore comprising at least 60 percent iron, substantially at the bottom of the reactor; reducing the iron ore to metallic iron in the presence of said reducing gas by agglomerating a portion of said iron ore on the outer surface of said pellets and at the same time generating the production of additional pellets by self-agglomeration; and continuously withdrawing reduced metallic iron pellets, screening out the pellets larger than those used for charging and returning the smaller pellets to the reactor, said comminuted iron ore introduced at a rate sufficient to replace the amount of metallic iron withdrawn.

4. A process for the production of metallic iron pellets from iron ore, comprising the steps of: charging a reactor with metallic iron pellets of size ranges corresponding to four sequential sizes of mesh Tyler smaller than the size range of the metallic iron pellets to be produced, said pellets being in proportion of substantially 50, 30, 15, and 5 percent, by weight, from the largest to the smallest size range, respectively; fluidizing the charged metallic iron pellets in said reactor by passing hydrogen at a temperature of about 1550° F. upward through the pellet bed, said pellet bed arranged so that the velocity of said hydrogen is greater at the bottom than at the top of said pellet bed; introducing preheated iron ore crushed to −325 mesh Tyler comprising at least 60 percent iron, substantially at the bottom of said pellet bed; reducing said iron ore to metallic iron at a temperature of about 1550° F. in the presence of said hydrogen, by agglomerating a portion of said iron ore on the outer surface of said pellets and at the same time generating the production of additional pellets by self-agglomeration; continuously withdrawing from the top of the reactor, hydrogen and water vapor mixtures produced by the reduction of the iron ore; and continuously withdrawing reduced metallic iron pellets, screening out the pellets larger than those of the size range used for charging the reactor, and returning the smaller pellets to the reactor, said comminuted iron ore introduced at a rate sufficient to replace the amount of metallic iron withdrawn.

5. A process for the reduction of iron ore and agglomeration of iron pellets in a fluidized bed, comprising the steps of: fluidizing metallic iron pellets in a reactor, said pellets being of varying sizes in proportion such that the total surface area of each of the varying sizes is substantially equal to provide agglomeration without defluidization of said bed, by passing hydrogen at a temperature of about 1550° F. upward through the pellet bed; continuously introducing preheated concentrated comminuted iron ore comprising at least 60 percent iron, substantially at the bottom of said pellet bed; and reducing the preheated comminuted iron ore to metallic iron at a temperature of about 1550° F. in the presence of said reducing gas by agglomerating a portion of said iron ore particles on the outer surface of said pellets and at the same time generating additional pellets by self-agglomeration.

References Cited in the file of this patent

UNITED STATES PATENTS

| | | |
|---|---|---|
| 2,789,034 | Swaine et al. | Apr. 16, 1957 |
| 2,827,371 | Quin | Mar. 18, 1958 |
| 2,848,316 | Davis et al. | Aug. 19, 1958 |

FOREIGN PATENTS

| | | |
|---|---|---|
| 1,058,821 | France | Nov. 10, 1953 |

UNITED STATES PATENT OFFICE
CERTIFICATE OF CORRECTION

Patent No. 3,053,648              September 11, 1962

Frank M. Stephens, Jr., et al.

It is hereby certified that error appears in the above numbered patent requiring correction and that the said Letters Patent should read as corrected below.

Column 1, lines 66 and 67, after "divided" insert -- feed --; column 2, line 39, for "fluidibed" read -- fluidized --; column 6, line 56, for "825" read -- 325 --.

Signed and sealed this 8th day of January 1963.

(SEAL)
Attest:

ERNEST W. SWIDER
Attesting Officer

DAVID L. LADD
Commissioner of Patents